UNITED STATES PATENT OFFICE.

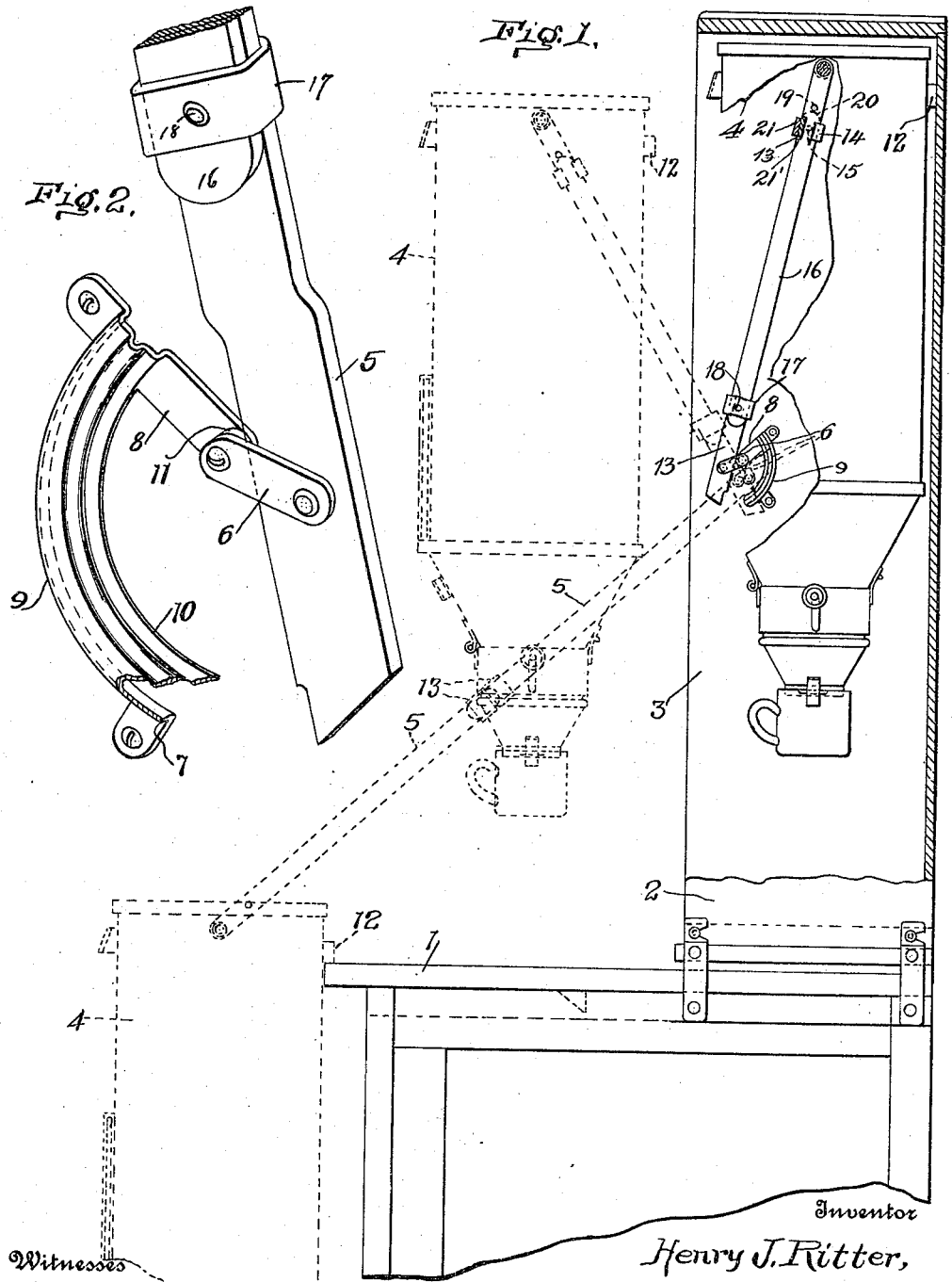

HENRY J. RITTER, OF TIPPECANOE CITY, OHIO.

SUPPORTING DEVICE FOR FLOUR-BINS AND THE LIKE.

1,184,379. Specification of Letters Patent. Patented May 23, 1916.

Continuation in part of application Serial No. 789,073, filed September 10, 1913. This application filed November 9, 1914. Serial No. 871,007.

*To all whom it may concern:*

Be it known that I, HENRY J. RITTER, a citizen of the United States, residing at Tippecanoe City, in the county of Miami and State of Ohio, have invented certain new and useful Improvements in Supporting Devices for Flour-Bins and the like, of which the following is a specification, reference being had therein to the accompanying drawing.

This invention relates to supporting devices for flour bins and is designed more particularly to support the flour bin of a kitchen cabinet as illustrated in my co-pending application for patent filed Sept. 10, 1913, Ser. No. 789,073, on which Letters Patent No. 1,146,521 were granted to me July 15, 1915. The present application is a continuation in part of said application, Ser. No. 789,073.

The object of the invention is to provide a device of this kind which will serve to support the bin or other receptacle in any one of a plurality of positions, such, for example, as its normal position, an intermediate or sifting position, to enable the flour therein to be sifted into a receptacle, and a third or filling position in which the bin is supported in such a position that it can be readily filled.

It is also an object of the invention to provide means for counterbalancing the weight of the bin so as to facilitate its movement.

In the accompanying drawings, Figure 1 is a side elevation, partly in section, of a cabinet and flour bin embodying my invention, and Fig. 2 is a detail view of one of the supporting plates showing the manner of connecting the arm to the supporting frame.

In these drawings I have shown the invention as embodied in a kitchen cabinet, the main features of construction of which are well known, but it will be understood that the invention not only may be embodied in cabinets of various kinds but that it is not essential that the bin should be inclosed in a cabinet, as the cabinet in the present structure merely forms a frame on which the supporting devices are mounted. In kitchen cabinets of the type here shown the flour bin is mounted within a compartment formed in that part of the cabinet above the work-table so that the discharge opening and flour sifter which are at the bottom of the flour bin may be readily accessible to one using the work-table. In order that the flour bin may be more readily filled, which is usually accomplished through the top thereof, means have been heretofore provided for moving the bin out of the compartment and into a position more readily accessible for filling purposes. However, these means contemplated the movement of the bin from one extreme position to another. The compartment in which the bin is mounted is usually narrow and it is impossible to place a receptacle of any considerable size beneath the bin in order to sift the flour into such receptacle, thus making it necessary to sift the flour into a small receptacle and transfer it to the larger receptacle, thereby causing considerable inconvenience and dissatisfaction. To overcome this objection I have provided a supporting device for the flour bin which will permit it to be moved out of its compartment and to be supported above the work-table, thereby permitting the use of any ordinary receptacle beneath the same. Further, this supporting device will permit the bin to be moved still farther forward and downward to support it in filling position. In that form of the invention here shown the bin may be dropped down until its top is about level with the work-table.

In that embodiment of the invention here illustrated I have shown a kitchen cabinet as comprising a lower portion 1 and an upper portion 2 mounted upon the lower portion, preferably separable therefrom, and provided with a vertical compartment 3 in which is supported a flour bin 4 of any suitable character. As here shown, the bin is provided in its lower end with a hopper and sifter and has means for supporting a measuring cup beneath the sifter but these features of construction do not enter into the present invention. The supporting device for the bin as here shown comprises a pair of arms or bars 5 pivotally connected at their upper ends to the bin near the top thereof and pivotally connected at their lower ends to the side walls of the compartment, which side walls, as stated, form a supporting frame to carry the bin. The points of connection of the lower ends of the arms with the supporting frame or side walls of the compartment are preferably in front of the center of gravity of the bin and, consequently, when the bin has been moved into its normal position, within the compartment, it will be moved by gravity against the rear wall of the compartment and supported by the arms. In order to support the bin in a vertical position in front of its compartment and above the work-table, which forms the top of the lower portion of the cabinet, to enable the flour to be sifted into a receptacle resting upon that work-table, I have provided stops to limit the outward movement of the bin and cause the same to be supported in its sifting position and have so connected the arms to the walls of the compartment that longitudinal movement may be imparted thereto to disengage them from the stops and permit of a further movement of the bin, to enable it to be dropped down into a position where it may be readily filled. As here shown, the arms are not pivoted directly to the walls of the compartment but are connected thereto by means of links 6 which are pivoted at their opposite ends to the respective arms and adjacent side walls of the compartment, the points of connection of the links to the arms being spaced some distance from the lower ends thereof to enable these projecting ends to engage stops to limit the outward movement of the bin.

In the present construction a plate or bracket 8 is rigidly secured to each wall of the compartment and is provided with a curved guide member 9, the lower end of which forms a stop 7. This guide member may be formed upon the plate in any suitable manner but preferably the plate is stamped out of sheet metal, as shown in the drawings. The guide member is also provided with a flange 10 which is spaced away from the wall, and extends over the end of the arm when it is moving along the guide member and serves to hold the same against lateral displacement, it being apparent, because of the link connection, that the arm will have more or less play. The links 6 are connected to the walls of the compartment through the medium of the plates 8 and spacing devices 11 are interposed between the ends of the links and the plates to space the links away from the walls of the compartment and to form stops for the arms, which are mounted between the links and the walls. It will be apparent, however, that it is not essential that the links be connected with the walls through the medium of the plates as they might be connected directly to the walls of the cabinet and the parts otherwise secured rigidly in their proper relative positions. It will be apparent that as the bin is drawn out of its compartment the projecting ends of the levers will be moved rearwardly and brought into engagement with the stops 7, thereby supporting the bin in its sifting position. If it is desired to move the bin further an upward longitudinal movement is imparted to the arms through the medium of the bin, this movement being permitted by the link connections for the arms, and the ends of the arms thereby enabled to clear the stops 7 and to continue their pivotal movement, this pivotal movement being guided by the guide 9 of the plate 8. This pivotal movement may be limited by a stop of any kind and in any suitable position, such as the stops formed by the plates 8, but, in the present instance, I have shown a stop secured to the bin, as shown at 12, and arranged to engage the edge of the work-table and thus support the top of the bin in a position slightly above the level of the table. In order that the bin may be moved into this position it is desirable that an extensible arm should be provided as it is not practical to provide a rigid arm which would support the bin in the compartment and at the same time be long enough to permit it to engage the edge of the table, as shown in the drawings. I have, therefore, formed the arm 5 in two parts which are slidably connected one to the other by means of clips. The part indicated at 13 on the drawing which is connected to the link 6 has a clip fixed to it at its upper end, indicated at 14, said clip being fixed thereto by means of a rivet 15. The second part of the arm, indicated at 16, is slidably mounted in said clip 14 and has fixed at its lower end a clip 17 riveted thereto, as shown at 18. This clip 17 slidably engages the part 13. It will be seen that the parts 13 and 16 can have longitudinal movement relative to each other. However, the two parts are loosely connected by means of their clips and have also a certain amount of lateral play. Upon the upper portion of the part 16 is fixed a lug 19 which engages the upper portion 20 of the member 13. By this arrangement the part 16, which is connected with the bin, is prevented from sliding down beyond a predetermined position upon the member 13. Adjacent the clip 14, which is shown broken away at 21, and upon the member 16 is a slotted portion 21'. This slotted portion is adapted to engage the clip 14 when the upper part 16 is moved laterally to the left and upwardly to disengage the lower end of the part 13 from its stop, the lateral play between the two parts allowing this movement. It will, therefore, be seen that as the bin is grasped by the user and lifted upwardly longitudinally a certain amount of movement to the left will also be given and the two parts 13 and 16 will be locked together, allowing the bodily movement of the same. If it were not for the slot engaging the clip it will be seen that the part 16 alone would slide upwardly without affecting the lower part 13 and disengaging it from its stop. A slight further movement of the bin will, however, disengage the notched members from the clips and permit of the extension of the arms. The extensibility of the arms not only enables an arm to be used which, when in its contracted position, will be short enough to support the bin within the compartment and when in its extended position will support the cabinet beyond the edge of the work-table, but it also enables the same arms to be used in connection with cabinets having work-tables of different width, thus avoiding the necessity of carrying in stock arms or supporting devices of several different sizes.

The operation of the device will be readily understood from the foregoing description and it will be apparent that I have provided a supporting device which will support the flour bin in any one of a plurality of positions at the option of the user; and which is of a strong, durable construction and very simple in its operation, there being no parts which can be readily disarranged to interfere with the manipulation thereof.

While I have shown and described one embodiment of the invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. In a device of the character described, the combination, with a cabinet having a compartment, and a flour bin mounted within said compartment, of a movable device to support said flour bin normally in said compartment and to permit the same to be moved forward out of said compartment, a stop to positively limit the forward movement of said bin and cause it to be supported in an upright position in front of said compartment, and means whereby said supporting device can clear said stop to permit of the further movement of said bin in the same direction.

2. In a device of the character described, the combination, with a cabinet having a compartment, and a flour bin mounted in said compartment and having a discharge opening at its lower end, of supporting arms pivotally connected at their upper ends to the upper portion of said bin and connected at their lower ends to said cabinet, near the bottom of said bin, for swinging movement, a stop to limit the swinging movement of said arms and cause them to support said bin in an elevated upright position immediately in front of said compartment, said arms having means whereby they may be caused to pass said stop, and a second stop to limit the further movement of said arms.

3. In a device of the character described, the combination, with a supporting frame having a compartment, a flour bin mounted in said compartment, extensible arms arranged on opposite sides of said bin, each arm being connected at one end to the bin and at its other end to said frame, stops to limit the pivotal movement of said arms in one direction, said arms having longitudinal movement to permit the same to be moved out of engagement with said stops, and means to prevent the extension of said arms during said longitudinal movement.

4. In a device of the character described, the combination, with a cabinet having a table and a compartment above said table, and a flour bin mounted within said compartment and having a discharge opening in its lower end, of supporting arms pivotally connected at their upper ends to said bin, connected at their lower ends with said cabinet and capable of movement about said lower connections to shift the center of gravity of said bin from one side of said lower connections to the other, said arms also being capable of longitudinal movement relatively to said lower connections and having portions extending downward beyond said lower connections, and stops arranged in the path of said downwardly extending portions to limit the movement of said arms, said stops being so arranged that the longitudinal movement of said arms in one direction will cause said lower portions to clear said stops and thus permit of further movement of said arms about said lower connections.

5. In a device of the character described, the combination, with a cabinet having a compartment, and a flour bin mounted within said compartment, of supporting arms connected at their upper ends with said bin, links connected to the respective arms near the lower ends thereof and pivotally supported within said compartment on the respective sides of said bin, and a stop on each side of said compartment arranged to be engaged by the ends of the respective arms.

6. In a device of the character described, the combination, with a cabinet having a compartment, and a flour bin mounted within said compartment, of supporting arms connected at their upper ends with said bin, links connected to the respective arms near the lower ends thereof and pivotally supported within said compartment on the respective sides of said bin, a stop on each side of said compartment arranged to be engaged by the ends of the respective arms to limit the movement thereof, said arms being adapted to be released from said stops by a longitudinal movement thereof, and a second stop to limit the continued movement of said bin.

7. In a device of the character described, the combination, with a cabinet having a compartment, a flour bin mounted in said compartment, and supporting arms connected at their upper ends with said bin, of a plate mounted within said compartment on each side of said bin, a link pivotally connected to each of said plates and pivotally connected with the respective arms, a stop rigidly secured to each plate and adapted to be engaged by the adjacent arm to limit the movement thereof.

8. In a device of the character described, the combination, with a cabinet having a compartment, a flour bin mounted in said compartment, and supporting arms connected at their upper ends with said bin, of a plate rigidly mounted on each side of said bin, a link pivotally mounted on said plate, a spacer arranged between said link and said plate, said link being connected to the adjacent arm at a point removed from the end thereof, said arm lying between said link and said plate, whereby it will engage said spacer when moved rearwardly, and a stop carried by said plate to be engaged by the lower end of said arm to limit the outward movement of the upper portion thereof.

9. In a device of the character described, the combination, with a cabinet having a compartment, and a flour bin mounted within said compartment, of supporting arms connected at their upper ends with said bin and connected at their lower ends with said cabinet and capable of pivotal movement about said lower connections, a stop arranged in the path of each arm, said arms being capable of longitudinal movement to release the same from said stops and permit of their further pivotal movement, and curved guides arranged to engage the ends of said arms during their pivotal movement.

10. In a device of the character described, the combination, with a cabinet having a compartment, and a flour bin mounted within said compartment, of supporting arms connected at their upper ends with said bin, links connected to the respective arms near the lower ends thereof and pivotally supported within said compartment on the respective sides of said bin, a stop on each side of said compartment arranged to be engaged by the ends of the respective arms, said arms being adapted to be released from said stops by the longitudinal movement thereof, and curved guides extending beyond said stop to engage the ends of said arms.

11. In a device of the character described, the combination, with a cabinet having a compartment, and a flour bin mounted within said compartment, of supporting arms connected at their upper ends with said bin, links connected to the respective arms near the lower ends thereof and pivotally supported within said compartment on the respective sides of said bin, a stop on each side of said compartment arranged to be engaged by the ends of the respective arms, said arms being adapted to be released from said stops by the longitudinal movement thereof, curved guides extending beyond said stops to engage the ends of said arms, and a flange projecting from the edges of said guides over the ends of the arms to hold the same against lateral displacement relatively to the guides.

12. In a device of the character described, the combination, with a cabinet having a compartment, and a flour bin mounted within said compartment, of supporting arms connected at their upper ends with said bin, links connected to the respective arms near the lower ends thereof and pivotally supported within said compartment on the respective sides of said bin, curved guides mounted adjacent to the ends of said arms, each guide having an end forming a stop to be engaged by the respective arms to limit the movement thereof, said arms being adapted to be released from said stops by a longitudinal movement thereof and said guides being arranged to be engaged by the ends of said arms during the further movement thereof, and means to limit said further movement of said arms.

In testimony whereof, I affix my signature in presence of two witnesses.

HENRY J. RITTER.

Witnesses:
F. W. SCHAEFER,
EDWARD L. REED.

Copies of this patent may be obtained for five cents each, by addressing the "Commissioner of Patents, Washington, D. C."